United States Patent
Kobayashi et al.

(10) Patent No.: US 6,229,950 B1
(45) Date of Patent: *May 8, 2001

(54) REPRODUCING APPARATUS CAPABLE OF CONTROLLING REPRODUCTION EQUALIZING CHARACTERISTIC

(75) Inventors: Kazuna Kobayashi, Tokyo; Yoshiyuki Sasaki, Kanagawa-ken, both of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/882,800

(22) Filed: Jun. 26, 1997

Related U.S. Application Data

(63) Continuation of application No. 08/528,340, filed on Sep. 14, 1995, now abandoned.

(30) Foreign Application Priority Data

Sep. 28, 1994 (JP) .................................... 6-233046
Oct. 4, 1994 (JP) .................................... 6-240037

(51) Int. Cl.[7] .................................................. H04N 5/94
(52) U.S. Cl. .............................. 386/47; 386/113; 360/65
(58) Field of Search .............................. 386/1, 2, 21, 40, 386/78, 79, 80, 113, 124, 46, 47; 360/32, 65, 77.01; H04N 5/94

(56) References Cited

U.S. PATENT DOCUMENTS

| | | | | |
|---|---|---|---|---|
| 3,381,083 | * | 4/1968 | Jensen et al. | 360/65 |
| 4,315,331 | * | 2/1982 | Lemoine et al. | 360/38.1 |
| 4,353,100 | * | 10/1982 | Inoue | 360/65 |
| 5,212,603 | * | 5/1993 | Hasegawa | 360/77.01 |
| 5,296,978 | * | 3/1994 | Ogura | 360/67 |
| 5,321,557 | * | 6/1994 | Shimotashiro et al. | 360/37.1 |
| 5,469,462 | * | 11/1995 | Kahlman et al. | 360/65 |

\* cited by examiner

*Primary Examiner*—Young Lee
(74) *Attorney, Agent, or Firm*—Robin Blecker & Daley

(57) ABSTRACT

An apparatus is arranged to perform an equalizing process for equalizing an input signal including a video signal, to obtain a reproduced video signal by performing reproducing processes on the signal equalized and to vary the equalizing characteristic of the equalizing process during a period other than a period during which the reproduced video signal is in process of being obtained. The arrangement enables the apparatus to prevent the reproduced video signal from being affected by changes of the equalizing characteristic and to optimize the equalizing characteristic without impairing the quality of reproduced images.

20 Claims, 17 Drawing Sheets

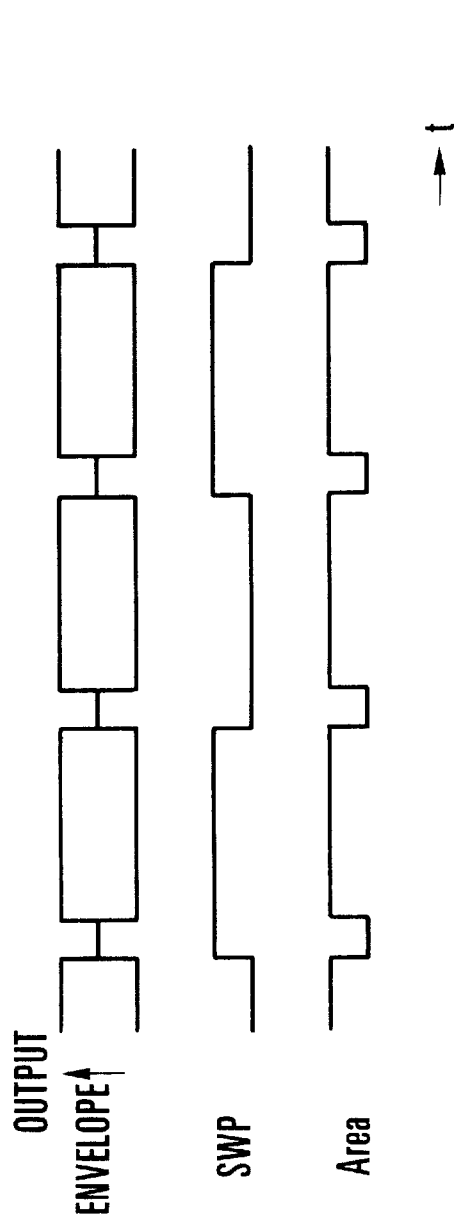
F I G. 8
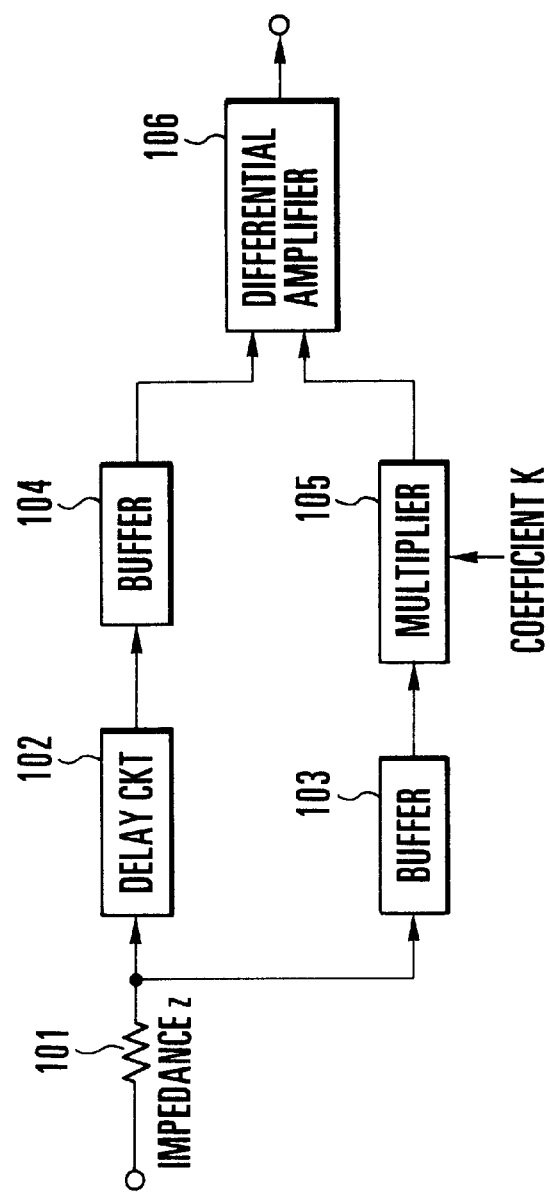
F I G. 9

TRACK F0

TRACK F1

TRACK F2

FREQUENCY SPECTRUM AFTER 24-25 CONVERSION

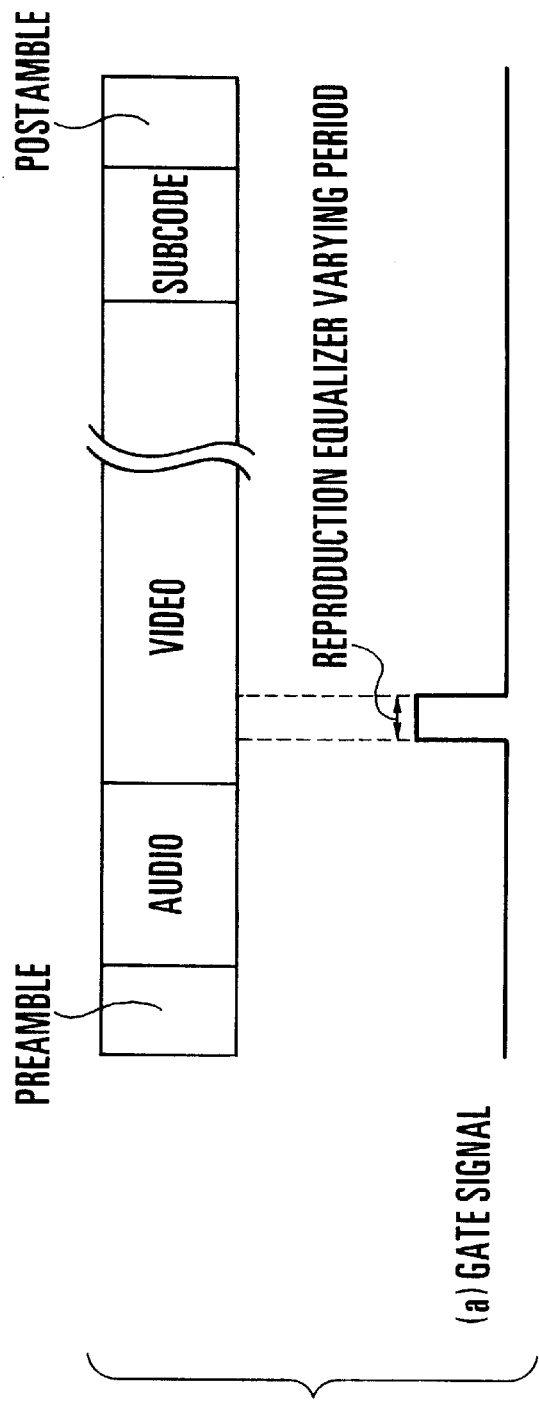
F I G. 21

REPRODUCING APPARATUS CAPABLE OF CONTROLLING REPRODUCTION EQUALIZING CHARACTERISTIC

This is a continuation application under 37 CFR 1.62 of prior application Ser. No. 08/528,340, filed Sep. 14, 1995 now abandoned.

BACKGROUND OF THE INVENTION

1. Field of the Invention

This invention relates to a reproducing apparatus and more particularly to a reproduction equalizing process to be performed by the apparatus on a digital signal reproduced from a recording medium.

2. Description of Related Art

In transmitting a signal, it has heretofore been practiced to obtain an adequate signal by carrying out, on the signal receiving side, an equalizing process whereby the frequency characteristic of the signal is controlled to compensate for any losses caused through a transmission system. Transmitting systems of this kind include, for example, a digital VTR which is arranged to record and reproduced a video signal, as a digital signal, on and from a magnetic tape. The digital VTR is also arranged to perform an equalizing process on the reproduced signal.

The equalizing process is performed by a circuit called an equalizer. The digital VTR of this kind is arranged as follows. FIG. 1 shows in a block diagram the conventional arrangement of a reproduction system of a digital VTR. Referring to FIG. 1, a signal reproduced from a magnetic tape 1 by heads 2A and 2B mounted on a rotary drum D is supplied to a head amplifier 3 through a switch SW. The signal is amplified by about 40 to 50 dB by the amplifier 3 and is then supplied to a reproduction equalizer 5. The switch SW operates, under the control of head switching pulses formed by a head switch pulse forming circuit 14 on the basis of a signal PG which indicates the rotation phase of the rotary drum D, to switch the outputs of the heads 2A and 2B from one over to the other.

The frequency characteristic of the reproduced signal obtained by the magnetic heads 2A and 2B includes, as shown in FIG. 2, a differential characteristic in its low frequency band and an attenuating characteristic in its high frequency band due to losses of varied kinds. The frequency characteristic of the reproduced signal is, therefore, corrected by forming an inverse characteristic combining the resonance characteristic of the head amplifier 3 and the equalizing characteristic of the reproduction equalizer 5. A signal outputted from the reproduction equalizer 5, as shown in FIG. 3 is supplied to a data detecting circuit 10 to be compared with a predetermined threshold value and restored to its original state of digital data. The digital data is demodulated by a demodulator 11. At this time, if the input to the data detecting circuit 10 includes any noise that exceeds the threshold value due to a tape noise, an amplifying noise of the head amplifier 3, or the like, the noise would cause, for example, data which should be "0" to be detected as "1" and thus would result in an error if the data is left as it is.

To avoid this, therefore, an error correcting-and-decoding circuit 12 (hereinafter referred to as an ECC circuit) is arranged to correct errors included in the reproduced signal, by using parity data added at the time of recording, to generate an error flag indicating an uncorrectable error for any data that is uncorrectable and to supply the error flag to a reproduced signal processing circuit 13. The reproduced signal processing circuit 13 is arranged to perform predetermined reproduction processes on the signal obtained from the ECC circuit 12 and to output the processed signal as a reproduced signal.

However, in the conventional digital VTR, the frequency control characteristic of the reproduction equalizer 5 is adjusted only at the time of shipment from a factory and is not arranged to be adjustable by a user after delivery to the user. Therefore, in cases where an optimum control point happens to deviate from what has been set at the time of shipment from the factory due to the kind of the tape and the wear of the head, the errors increase at the time of data detection and, as a result, it becomes impossible to obtain a good reproduced image.

If the user tries to adjust the equalizing characteristic, the high frequency band gain of the equalizer must be varied as shown in FIG. 4, for example, on the basis of a rate of actual errors in the reproduced signal by finding an optimum point where the number of data errors in the reproduced signal can be minimized as shown in FIG. 5. However, in such a case, the characteristic of the equalizer must be varied while a video or audio signal is actually reproduced. The number of uncorrectable data then inevitably increases at the two ends of a characteristic variable range. The increase of uncorrectable data then would affect the reproduced image to lower the quality of the image.

To prevent the quality of the image from deteriorating, if the characteristic variable range is narrowed, it is inevitable to have some spurious optimum point, for example, as represented by a point "b" in FIG. 6. The presence of such a spurious optimum point "b" then would prevent adjustment to a true optimum point "a" shown in FIG. 6.

SUMMARY OF THE INVENTION

It is a general object of this invention to solve the above-stated problems of the prior art.

It is a more specific object of this invention to provide a reproducing apparatus which is capable of optimizing an equalizing characteristic without any adverse effect on a video signal to be outputted.

Under this object, a video signal reproducing apparatus which is arranged as an embodiment of this invention includes input means for receiving an input signal including a video signal, equalizing means for equalizing the input signal, processing means for obtaining a reproduced video signal by performing reproducing processes on a signal outputted from the equalizing means, and control means for varying an equalizing characteristic of the equalizing means during a period other than a period during which the reproduced video signal is being obtained by the processing means.

It is another object of this invention to provide a reproducing apparatus which is capable of preventing the quality of a reproduced signal from being deteriorated, by optimizing the equalizing characteristic of a reproduction equalizer in all cases.

Under that object, a reproducing apparatus which is arranged as another embodiment of this invention includes input means for receiving an input signal, equalizing means for equalizing a signal outputted from the input means, processing means for obtaining a reproduced signal by performing reproducing processes on a signal outputted from the equalizing means, and control means for varying an equalizing characteristic of the equalizing means during a predetermined period before the processing means begins to perform the reproducing processes on the signal.

These and other objects and features of this invention will become apparent from the following detailed description of embodiments thereof taken in connection with the accompanying drawings.

BRIEF DESCRIPTION OF THE DRAWINGS

FIG. 8 shows in a timing chart the process of counting the number of errors in the embodiment.

FIG. 9 shows in a block diagram the arrangement of an equalizer shown in FIG. 7.

FIG. 21 shows the operation of a gate signal generating circuit included in the VTR of FIG. 18.

DETAILED DESCRIPTION OF THE PREFERRED EMBODIMENTS

The following describes some of embodiments of this invention in detail with reference to the drawings.

Figure 7:
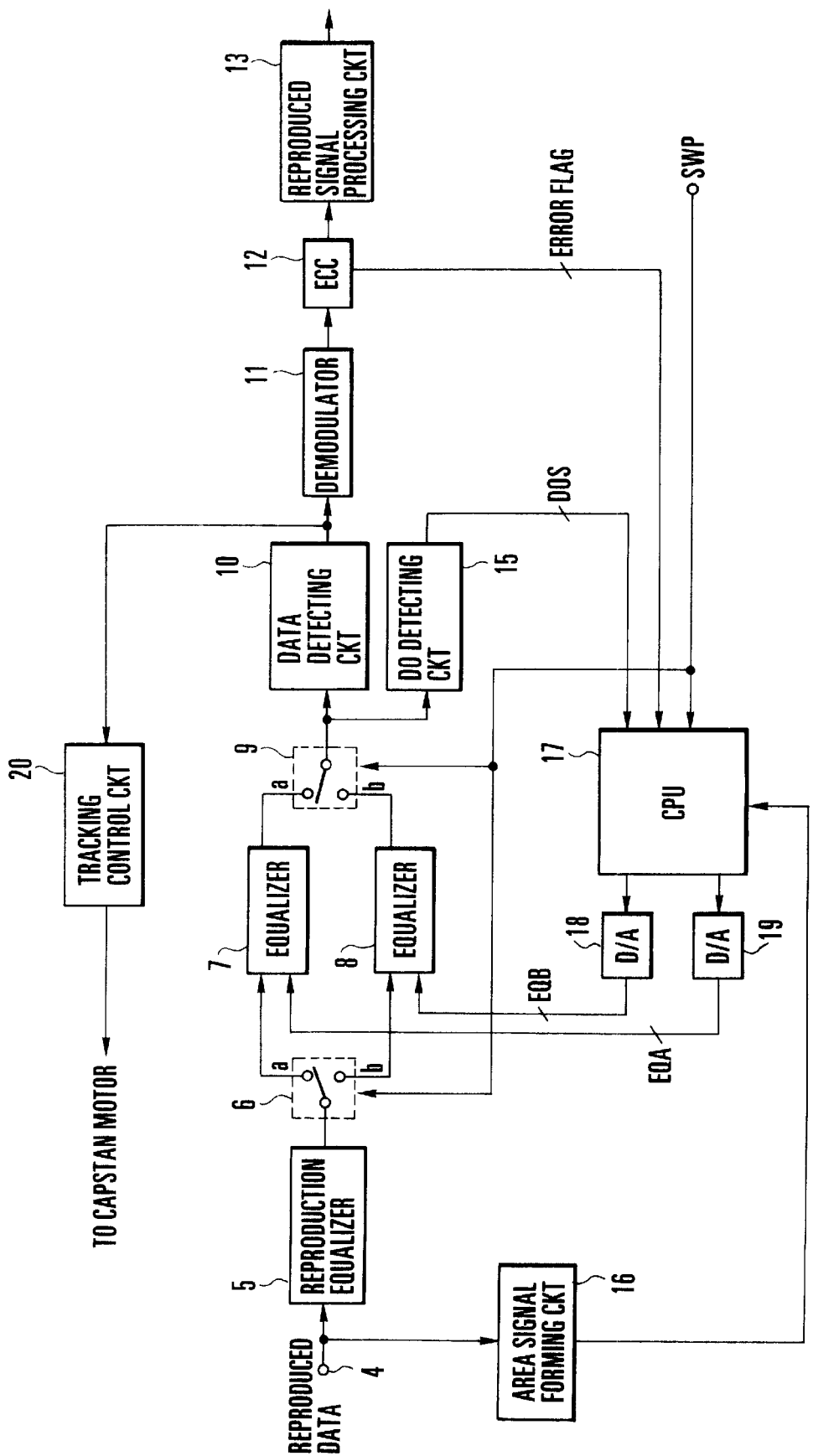
FIG. 7 shows in a block diagram the arrangement of a digital VTR which is an embodiment of this invention.

In this case, this invention is applied to a digital VTR. FIG. 7 is a block diagram showing the arrangement of a reproduction system of the digital VTR.

Figure 1:
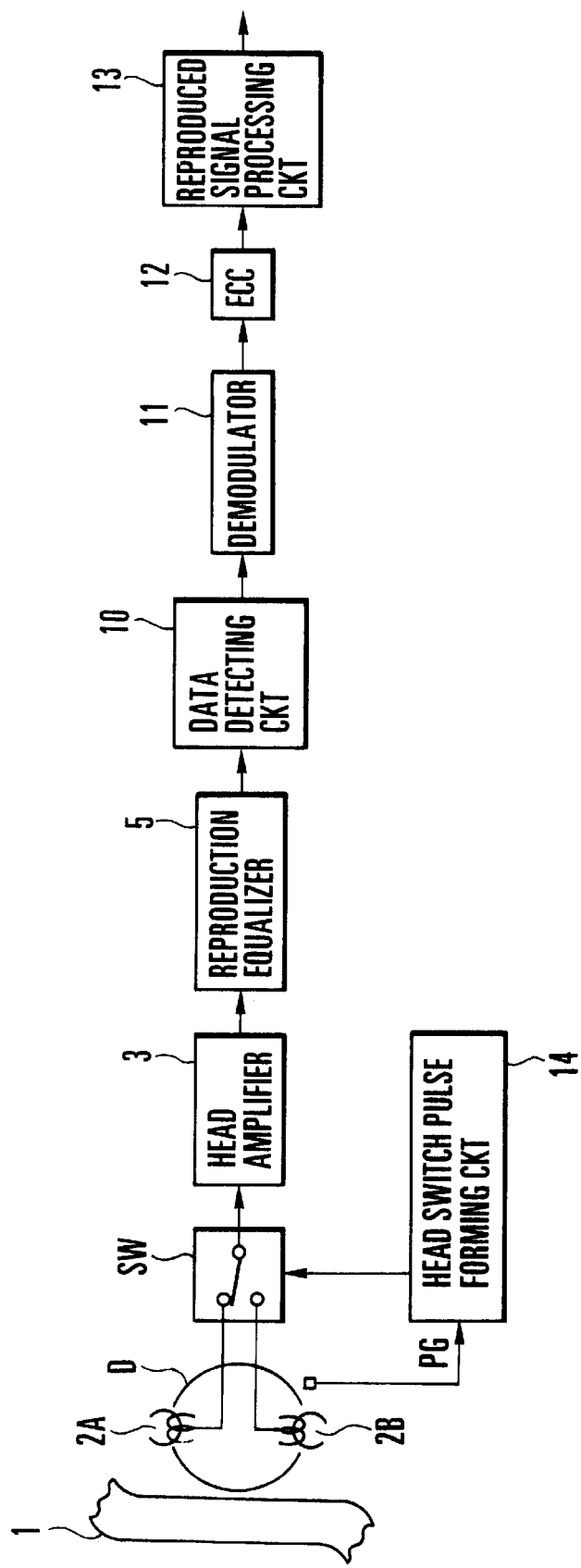
FIG. 1 shows in a block diagram the arrangement of the conventional digital VTR.
Figure 2:
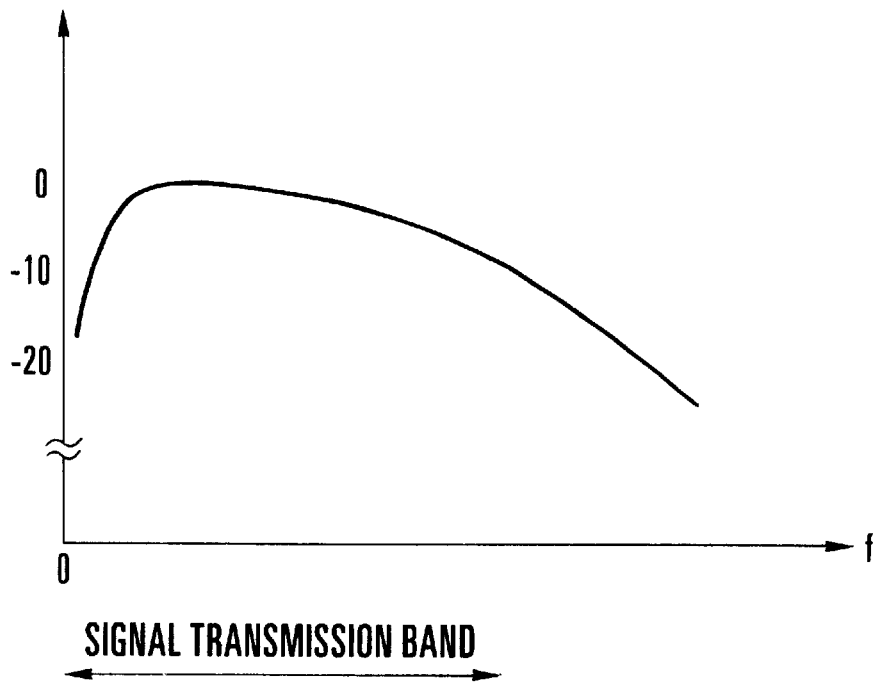
FIG. 2 shows the frequency characteristic of a signal reproduced by the digital VTR of FIG. 1.
Figure 3:
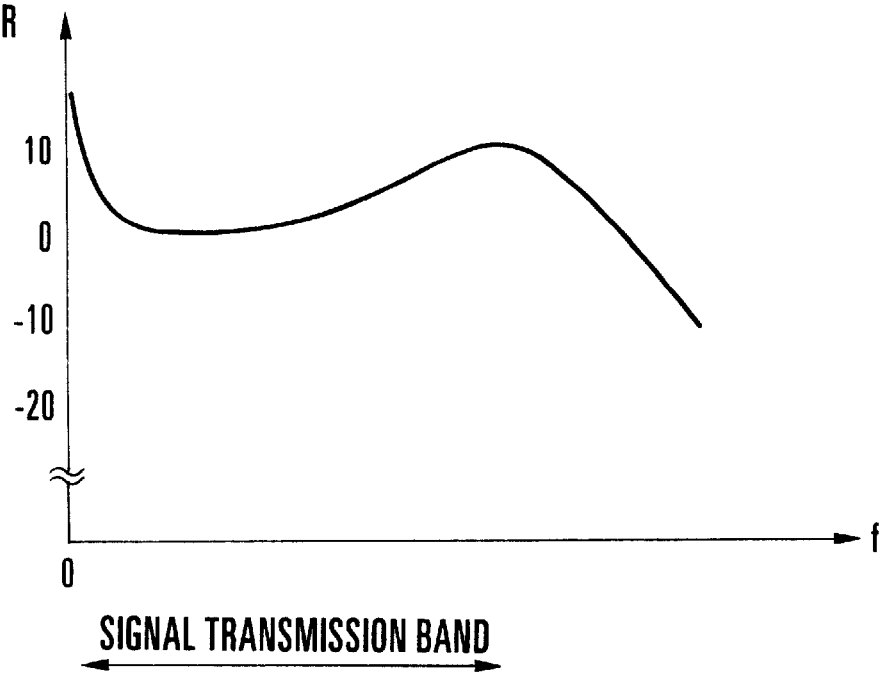
FIG. 3 shows a frequency control characteristic obtained jointly by a reproduction equalizer and a head amplifier of the digital VTR shown in FIG. 1.
Figure 4:
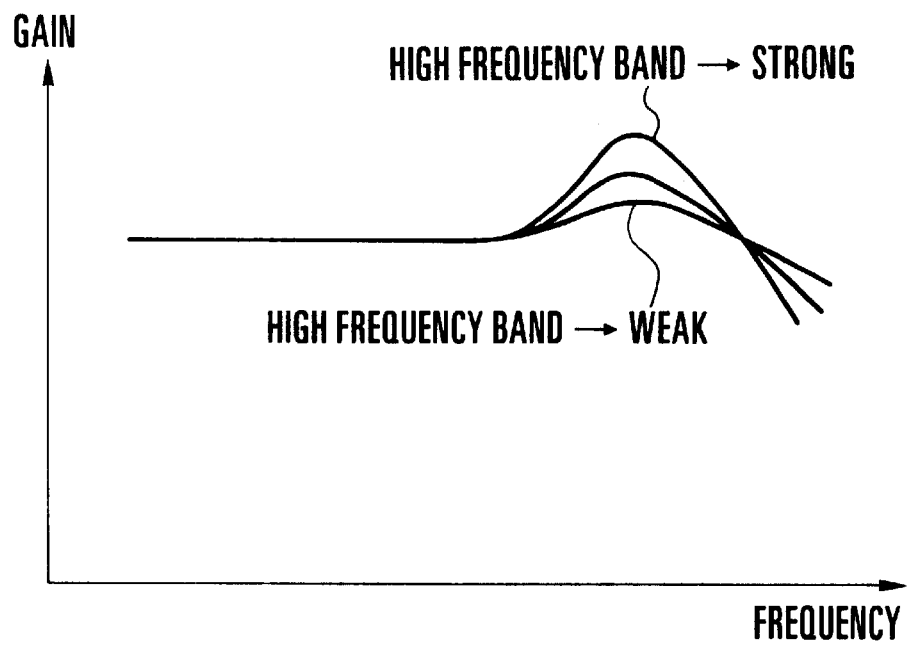
FIG. 4 shows changes taking place in an equalizing characteristic.

Referring to FIG. 7, a digital signal which is reproduced from a magnetic tape 1 by magnetic heads 2A and 2B arranged as shown in FIG. 1 is supplied through an input terminal 4 to a reproduction equalizer 5 which consists of an LC filter and has a fixed characteristic. Further, the digital VTR includes the two heads 2A and 2B of different azimuth angles and supplies signals obtained by these heads alternately to the input terminal 4 in the same manner as the conventional VTR shown in FIG. 1.

The reproduction equalizer 5 is arranged to correct the frequency characteristic of the input signal including the differential characteristic of the low frequency band and the attenuation characteristic of the high frequency band, which is caused by losses of varied kinds as mentioned in the foregoing, and to supply its output via a switch 6 to equalizers 7 and 8 which consist of transversal filters of variable characteristics. The switch 6 and another switch 9 are arranged to alternately supply the signal outputted by one head and the signal outputted from the other head, for every track, by changing their switching positions according to a head switch pulse signal SWP which is supplied from the head switch pulse forming circuit 14 shown in FIG. 1.

FIG. 9 shows the circuit arrangement of each of the equalizers 7 and 8. Referring to FIG. 9, each of the equalizers 7 and 8 is arranged as follows. A matching resistor 101 is provided for the circuit. A delay circuit 102 is arranged to delay an input signal. Buffers 103 and 104 are arranged to have a high impedance. A multiplier 105 is arranged to multiply the output of the buffer 103 by a coefficient K. A differential amplifier 106 is connected to the buffer 104 and the multiplier 105.

To the buffer 104 is supplied, via the resistor 101, a signal which is delayed for a period of time t by the delay circuit 102. The other buffer 103 is arranged to receive the input signal via the resistor 101 and also to receive a signal which is returned by reflection due to the high input impedance of the buffer 104 and delayed for a period of time 2t. The output of the buffer 103 is supplied to the multiplier 105 to be multiplied by the coefficient K. The output of the multiplier 105 and that of the buffer 104 are supplied to the differential amplifier 106.

A transmission characteristic G for transmission of the input signal up to the output of the differential amplifier 106 can be expressed as follows:

$$G=(1-2K \cos \omega t)e^{j\omega t}$$

wherein $\omega=2\pi f$

Figure 10:
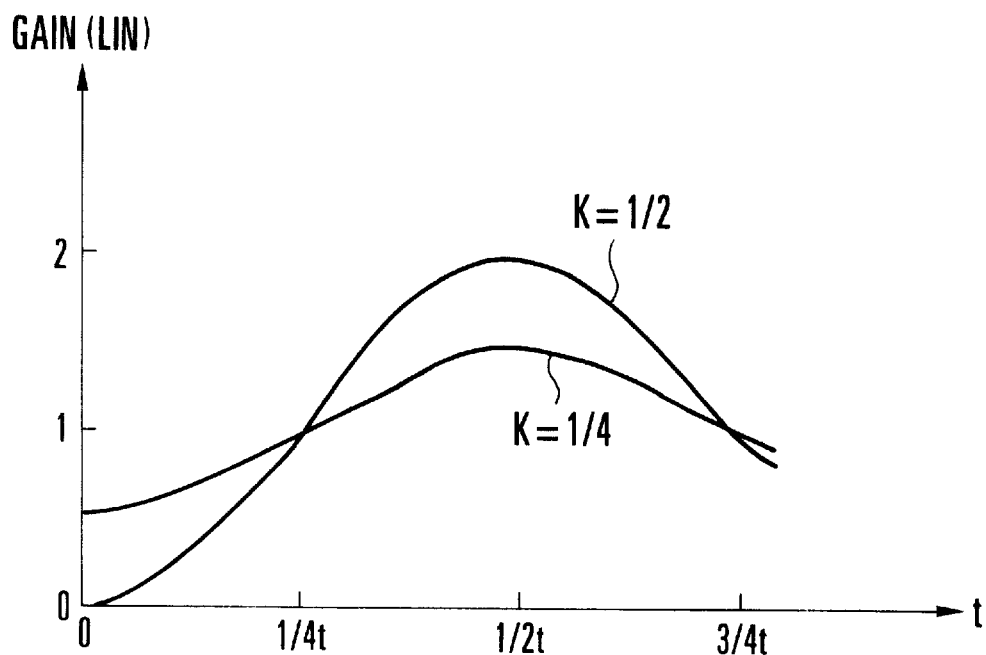
FIG. 10 shows a frequency control characteristic of a circuit arranged as shown in FIG. 9.

Although there is the delay for the time t, no phase distortion arises even if an amplitude characteristic is changed. FIG. 10 shows frequency characteristics obtained by changing the coefficient K for the equalizer. This coefficient K is arranged to be supplied from a CPU 17 and to vary the frequency characteristic of the equalizer by varying the value thereof in such a way as to obtain an optimum equalizing characteristic, as will be described later. Signals obtained with their high frequency components controlled by the equalizers 7 and 8 are supplied via the switch 9 to a data detecting circuit 10 and a dropout (DO) detecting circuit 15.

The signal which is converted into digital data by the data detecting circuit 10 in the same manner as described in the foregoing is supplied to a demodulator 11 to be demodulated there. The demodulated signal (digital data) is supplied to an ECC circuit 12 to have any code error thereof corrected. Then, the ECC circuit 12 generates (error) flags for data having uncorrectable errors to indicate that the data error is uncorrectable as mentioned in the foregoing. The error flags are supplied to the CPU 17. When any parts of the envelopes of the signals equalized by the equalizers 7 and 8 are lower than a predetermined level, the dropout detecting circuit 15 decides the part to be a dropout period and supplies the CPU 17 with a dropout signal (hereinafter referred to as DOS) which indicates the dropout period.

The CPU 17 is arranged to vary the coefficient K of the multiplier 105 in such a way as to optimize the characteristics of the equalizers 7 and 8 as described above. Since the value of the coefficient K outputted from the CPU 17 is in the form of digital data, the coefficient K is converted into analog data by D/A converters 18 and 19 before the coefficient K is supplied to the equalizers 7 and 8. In this instance, as will be described in further detail later, the coefficient K is set at such a value that serves to minimize the number of error flags outputted per unit time from the ECC circuit 12.

The equalizing characteristic in the embodiment is varied after completion of tape loading with the VTR loaded with a tape cassette which is not shown and before the signal which is reproduced from the magnetic tape and subjected to the processes of the reproduced signal processing circuit 13 is outputted to the outside as a reproduced signal. The timing of the control over the equalizer is shown in FIG. 11.

Figure 11:
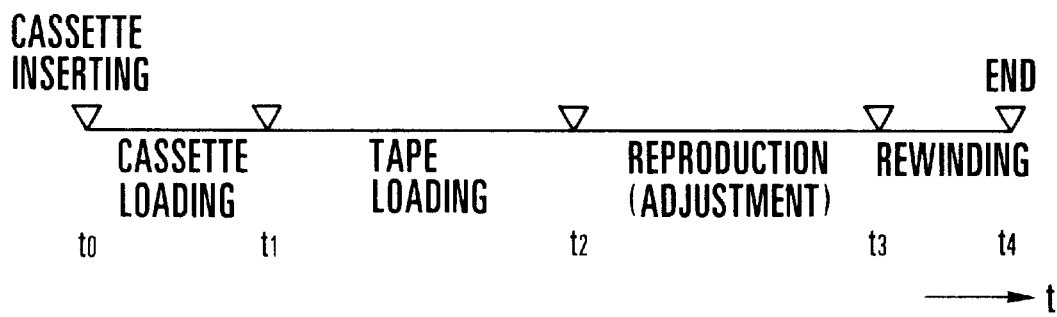
FIG. 11 shows in a timing chart an equalizing characteristic control action performed by the same embodiment of this invention.

Referring to FIG. 11, when the cassette is inserted into the VTR at a time point t0, the cassette is loaded at a point of time t1. The VTR is then loaded with the tape. Upon detection of completion of tape loading at a time point t2 by a detecting circuit which is not shown, the equalizing characteristic is controlled by using the signal obtained from the tape, without outputting any reproduced signal, i.e., without outputting any images and sounds recorded, and an optimum value of the coefficient K is obtained. When an optimum value of the coefficient K is detected at a time point t3, the tape is rewound back to the loaded position of the tape on the basis of a time code and a subcode which are recorded on the tape along with video data and audio data, and the control over the equalizer comes to an end.

Figure 12:
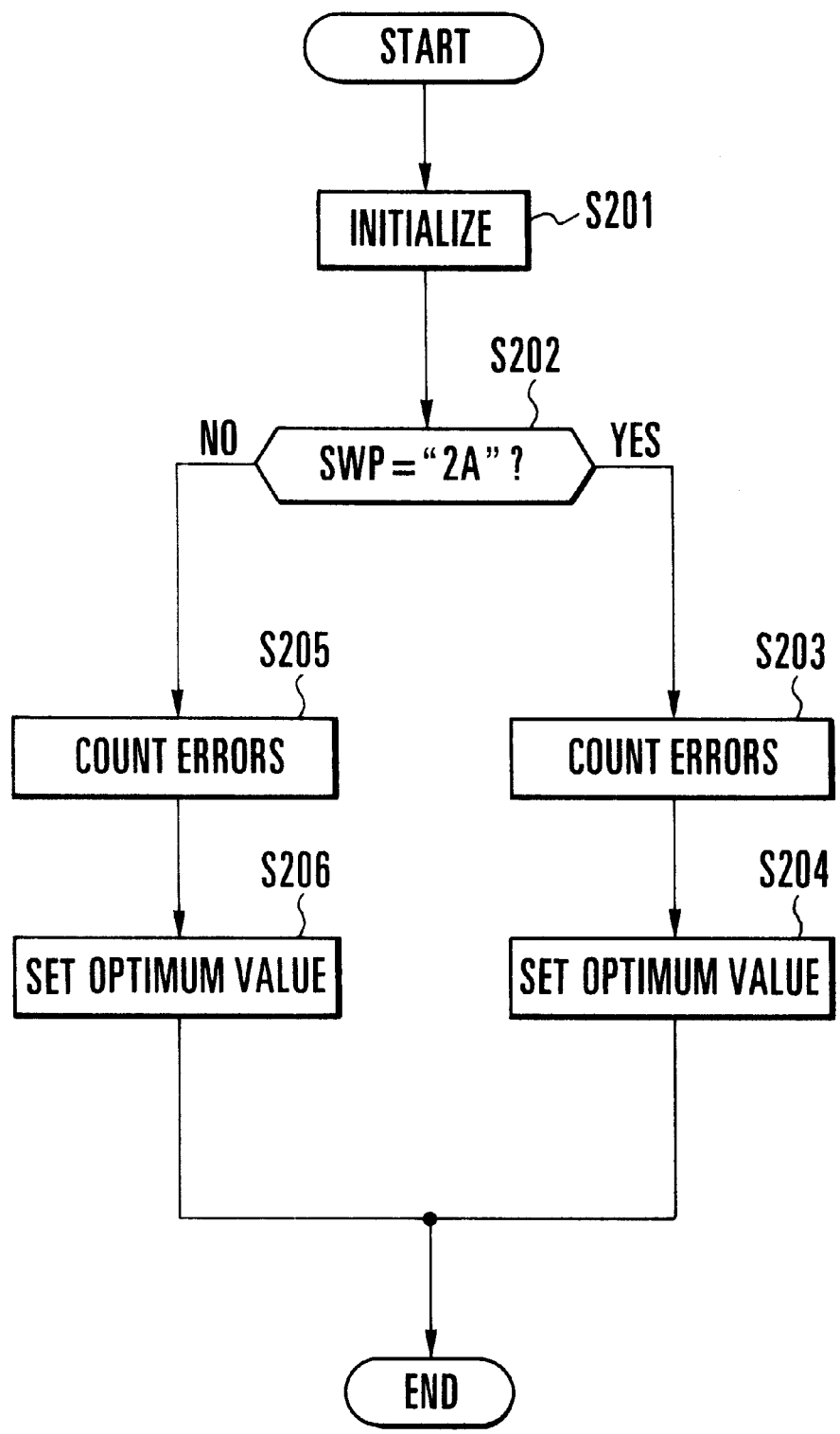
FIG. 12 shows in a flow chart the operation of the embodiment of this invention.

The control by the CPU 17 over the equalizing characteristic of the equalizer is next described. FIG. 12 is a flow chart showing the whole control operation of the CPU 17 over the equalizing characteristic.

Referring to FIG. 12, at a step S201, upon completion of tape loading with the cassette inserted as mentioned above, a variable P which indicates a control point of the coefficient K, the number of track and the count number of errors are initialized to "0".

In the case of the embodiment, the number of errors is counted for 10 tracks and an optimum value of the coefficient K is decided on the basis of the count value of errors. The errors are counted by using area signals which are as shown in FIG. 8. In other words, the CPU 17 counts the error flags coming from the ECC circuit 12. The count value is reset when a total of ten area signals are counted for each of the heads. A count value obtained immediately before resetting is considered to be the number of errors. The area signals are obtained from an area signal forming circuit 16 by detecting the envelope of the reproduced signal. The area signals and the head switch pulses are supplied to the CPU 17.

After the initializing action of the step S201, the flow of operation comes to a step S202. At the step S202, a check is made on the basis of the head switch pulses to find if the reproduced signal is a signal obtained from the head 2A. If so, the flow comes to a step S203 to count the number of errors in the amount of the signal reproduced from ten tracks. The flow then comes to a step S204. At the step S204, the characteristic of the equalizer 7 which equalizes the reproduced signal coming from the head 2A is controlled and set at an optimum value.

If the reproduced signal is found to be a signal obtained not by the head 2A but by the other head 2B at the step S202, the flow comes to a step S205 to count the number of errors in the amount of the signal reproduced from ten tracks, in the same manner as the step S203. At a step S206, the characteristic of the equalizer 8 is controlled and set at an optimum value.

Figure 13:
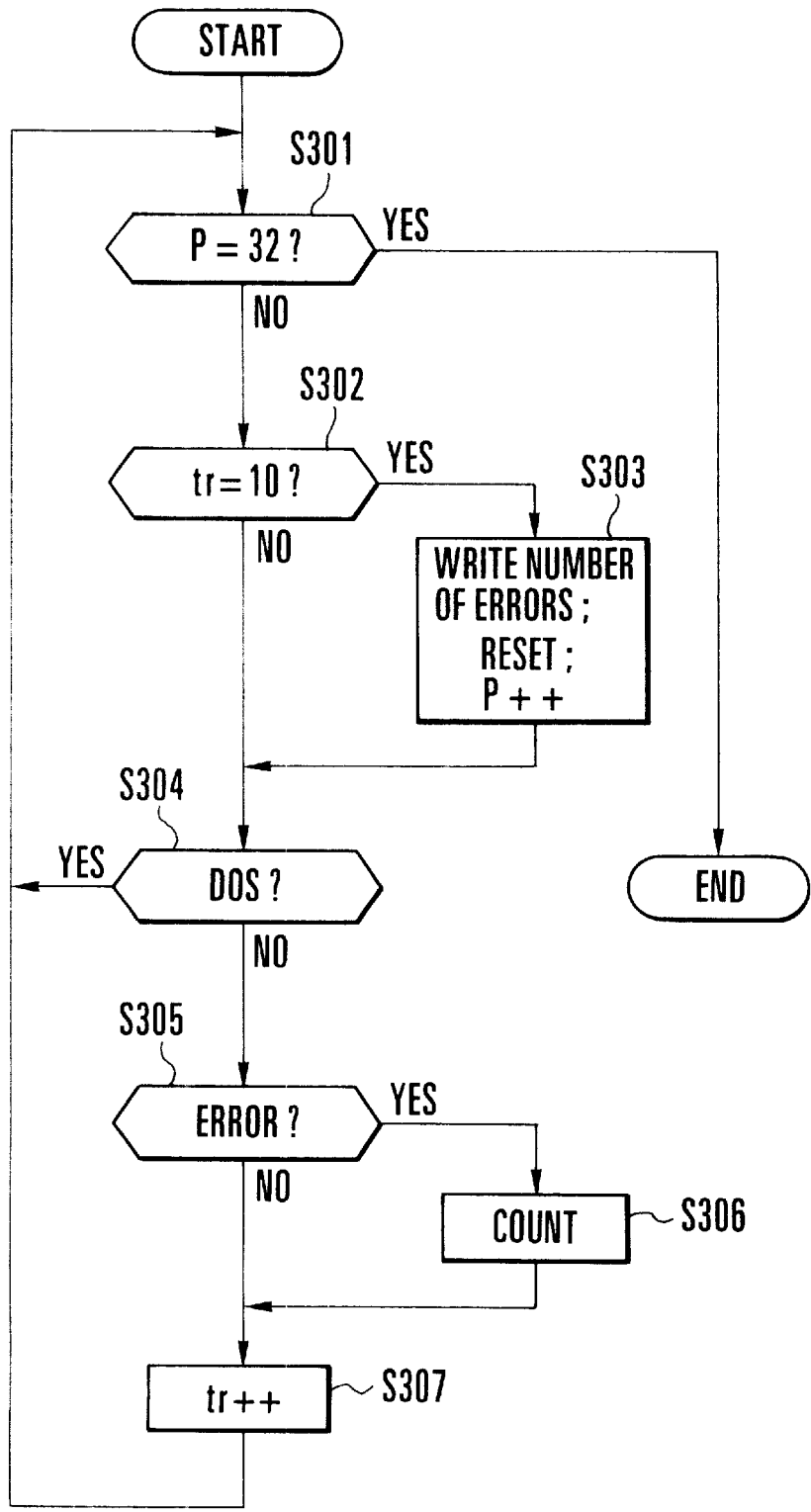
FIG. 13 shows in a flow chart the processes of counting the number of errors in the same embodiment.

An error number counting process of FIG. 12 is next described as follows. FIG. 13 is a flow chart showing a flow of operation of the error number counting process. The embodiment is arranged to control and adjust the value of the coefficient K to one of a total of 32 control points. The errors included in the amount of the signal reproduced from 10 tracks is counted at each of the 32 control points.

After a start of the error number count, the flow comes to a step S301 of FIG. 13. At the step S301, a check is made to find if the control point variable P for the coefficient K is at 32. If so, the control point indicates the coefficient K has been varied to all the 32 points. In that instance, therefore, the flow is brought to an end. If the variable P is found to be less than 32 at the step S301, the flow comes to a step S302. At the step S302, a check is made to find if the number of reproducing tracks tr has reached 10. If not, the flow comes to a step S304. If so, the flow comes to a step S303. At the step S303, the count number of errors is written into an internal memory which is not shown. The error count number and the track number tr are reset, and the variable P is changed by one point. The flow then proceeds to the step S304.

At the step S304, the dropout signal DOS is checked to find if there is any dropout in a signal reproduced from a currently processed track. If so, the flow comes back to the step S301 without using the signal reproduced from the track for the count of errors. If the signal DOS is found not supplied, thus indicating that there is no dropout, the flow comes to a step S305 to detect errors included in the reproduced signal. At a step S306, the number of errors is counted. At a step S307, 1 is added to the track number tr and the flow comes back to the step S301.

With errors in the reproduced signal counted in the above-stated manner, the counting of errors is brought to an end when the number of the control points P of control over the coefficient K reaches 32. The operation then shifts to the process of setting the coefficient K at an optimum value.

Figure 14:
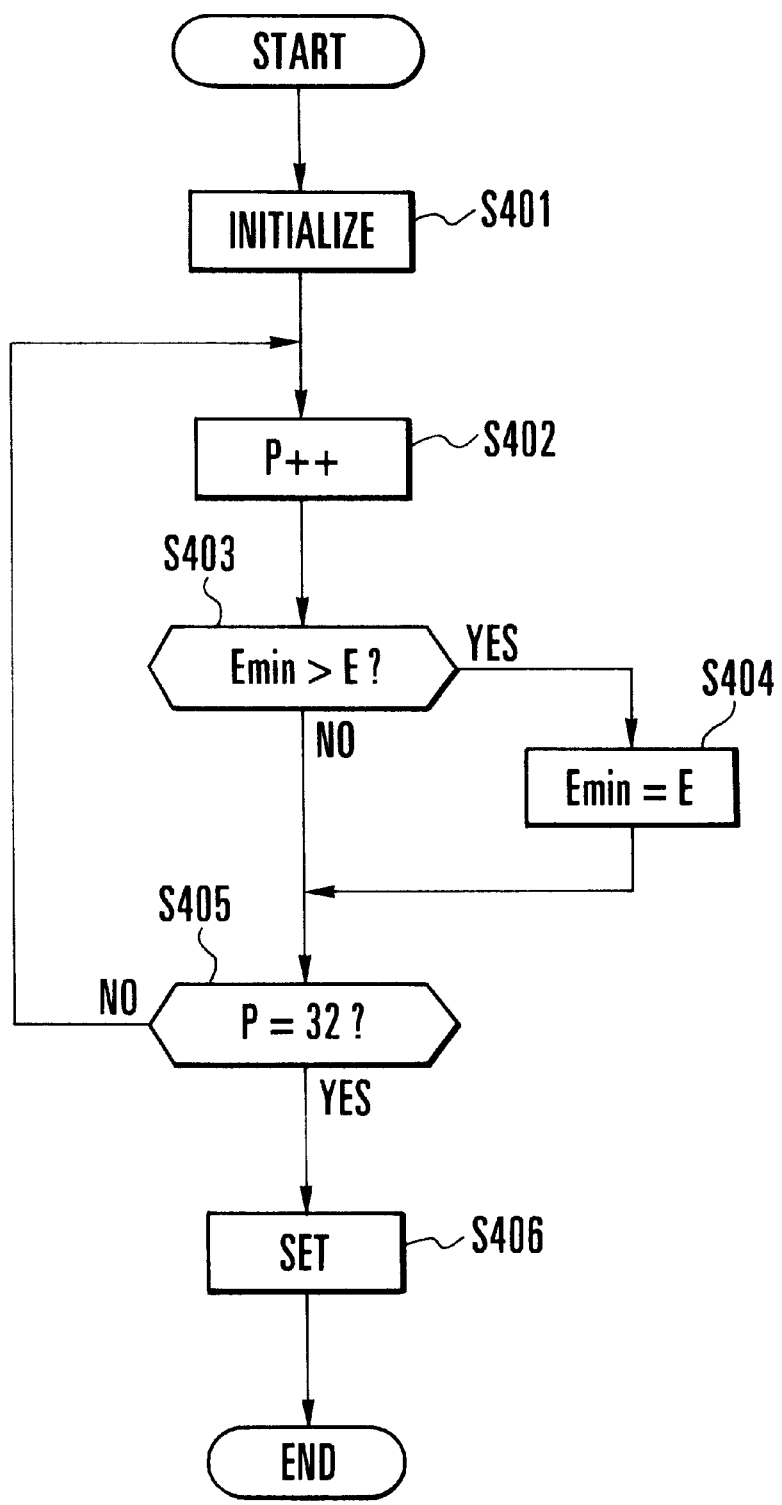
FIG. 14 shows in a flow chart the processes of setting an optimum value in the same embodiment.

The operation of setting an optimum value is performed by making a search for one of the 32 control points at which a minimum number of errors is obtained among the 32 points and by setting the coefficient K at the value of this point. FIG. 14 shows in a flow chart the operation for the optimum value setting process.

Referring to FIG. 14, at a step S401 after the start of the optimum value setting process, the variable control point P and the minimum value Emin of the number of errors are initialized. More specifically, 1 is substituted for the variable P, and the count value of the number of errors at the point 1 is substituted for the minimum value Emin of the number of errors.

At a step S402, 1 is added to the variable P. The number of errors E counted at a next point is read out from the memory. At a step S403, a check is made to find if the error number E currently read out is smaller than the minimum value Emin. If not, the flow of operation comes to a step S405. If so, the flow comes to a step S404 to substitute the error number E for the minimum value Emin before the flow comes to the step S405.

At the step S405, a check is made to find if the variable control point P has reached 32. If not, the flow comes back to the step S402. If so, the flow comes to a step S406. At the step S406, the current control point P corresponding to the current minimum value Emin is set as an optimum value of the coefficient K.

Figure 15:
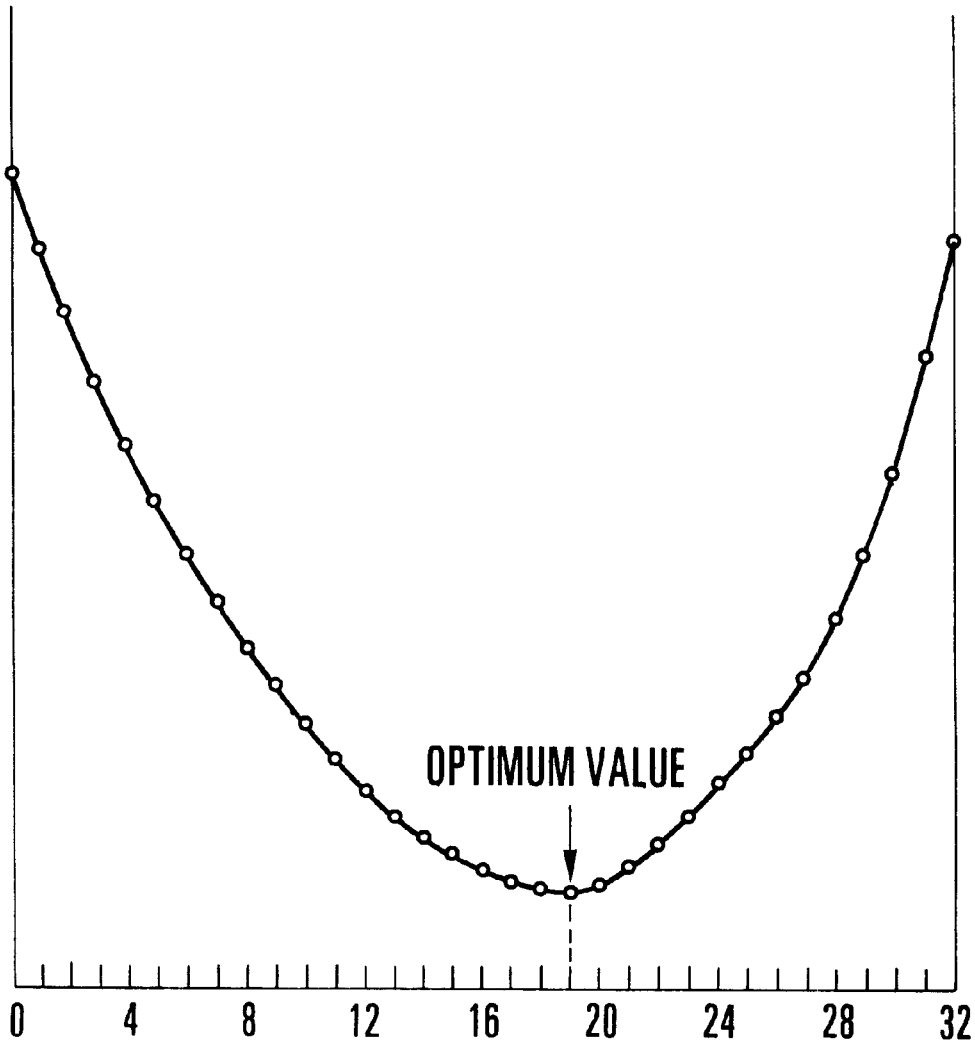
FIG. 15 shows equalizing characteristic control points in relation to the number of errors counted.

This process is shown in FIG. 15. FIG. 15 shows how the numbers of errors are counted in relation to the various control points. As apparent from FIG. 15, the value of the coefficient K corresponding to a control point 19 is set, in this case, as an optimum value of the coefficient K.

The CPU 17 is arranged to control the equalizing characteristic by sending this optimum value of the coefficient K to the equalizers 7 and 8. The processes described above are carried out for each of the heads 2A and 2B independently of each other. Therefore, the equalizing characteristic can be controlled appositely to the characteristic of each of the heads 2A and 2B.

As described above, the embodiment is arranged to make a search for a setting value most apposite to the equalizer on the basis of the number of errors included in the reproduced signal. Therefore, the equalizing characteristic always can be optimized without being affected by the wear of the head and the kind of the tape in use.

Further, as apparent from FIG. 15, the number of errors sometimes increases to a great extent if the control characteristic of the equalizer is greatly varied. In such a case, if the equalizer is controlled while reproduced images and sounds are allowed to be outputted, the quality of reproduced images and sound would be greatly deteriorated to make them very disagreeable. To avoid this, the embodiment is arranged to make the search for the optimum setting value by varying the characteristic of the equalizer before outputting the reproduced images and sounds obtained through reproduction processes after the cassette is inserted. Therefore, the quality of the reproduced images is never affected by the process of varying the characteristic of the equalizer.

Since a loading action is performed without fail in replacing one cassette with another, even if the kind of the magnetic tape changes from one kind to another, the reproduced signal can be equalized with a frequency characteristic most apposite to the tape. Therefore, the number of errors in the reproduced signal decreases to ensure an adequate state of the reproduced signal.

A second embodiment of this invention is next described below. Generally, in a digital VTR, the error rate of the signal obtained after error correction and decoding is often of an order not exceeding $10^{-5}$. An S/N ratio to be used in setting an optimum value by counting errors, therefore, tends to be insufficient.

This problem can be solved by adjusting the equalizer while counting errors which are included in a signal reproduced in an off-track mode in which the head is intentionally set in an off-track position. By this method, errors in the reproduced signal can be increased to give a better S/N ratio for detection of an optimum point. In the case of the second embodiment described below, the equalizer is adjusted by utilizing the off-track mode.

In the field of digital VTRs, there has been proposed a method of multiplexing a tracking pilot signal with recording data by carrying out a digital modulation process of adding control data of one bit to the data of 24 bits. The details of this method are as disclosed in Japanese Laid-Open Patent Application No. HEI 4-255969.

Figure 16A:
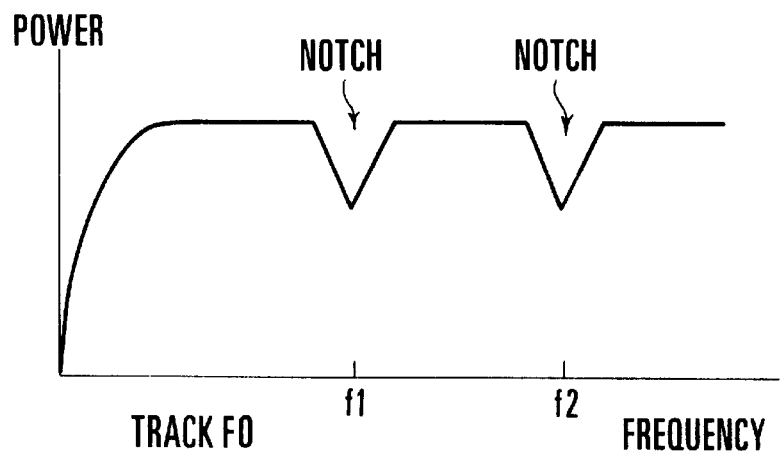
FIGS. 16(a), 16(b) and 16(c) show frequency spectra of reproduced signals obtained by the embodiment of this invention.
Figure 16B:
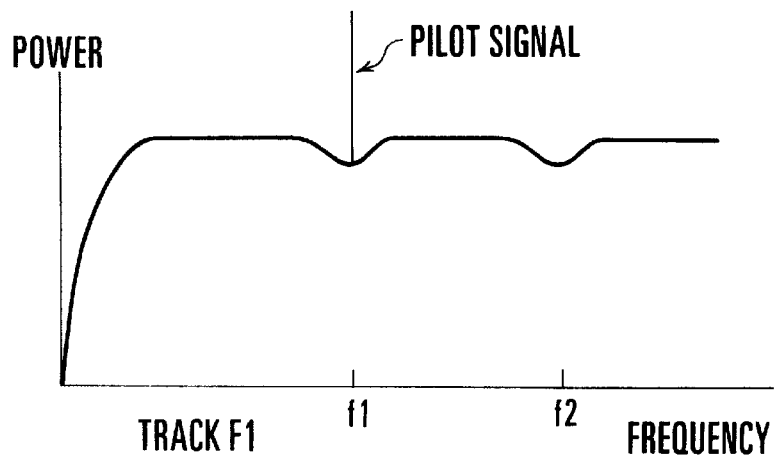
Figure 16C:
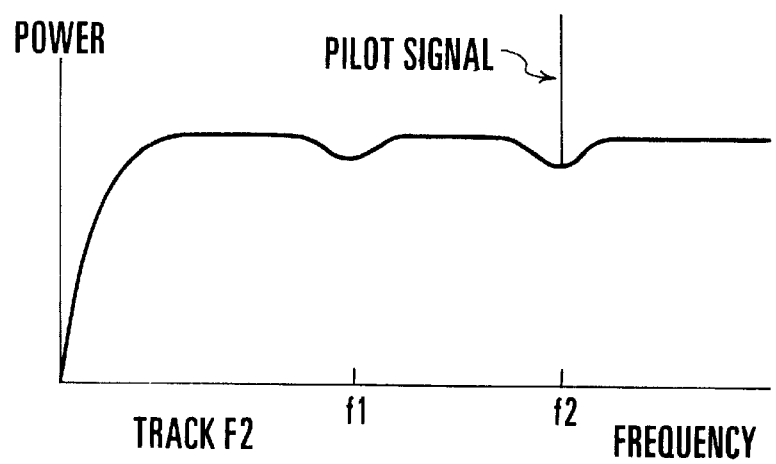

According to this method, digital signals are recorded while forming three kinds of signals of frequency spectra on a magnetic tape as shown in FIGS. 16(a) to 16(c). FIG. 16(a) shows a recording signal of a track for which no pilot signal component is multiplexed with the recording signal. FIG. 16(b) shows a recording signal of a track where a frequency component of a frequency f1 is multiplxed as a pilot signal. FIG. 16(c) shows a recording signal of a track where a frequency component of a frequency f2 is multiplexed as a pilot signal.

Figure 17:
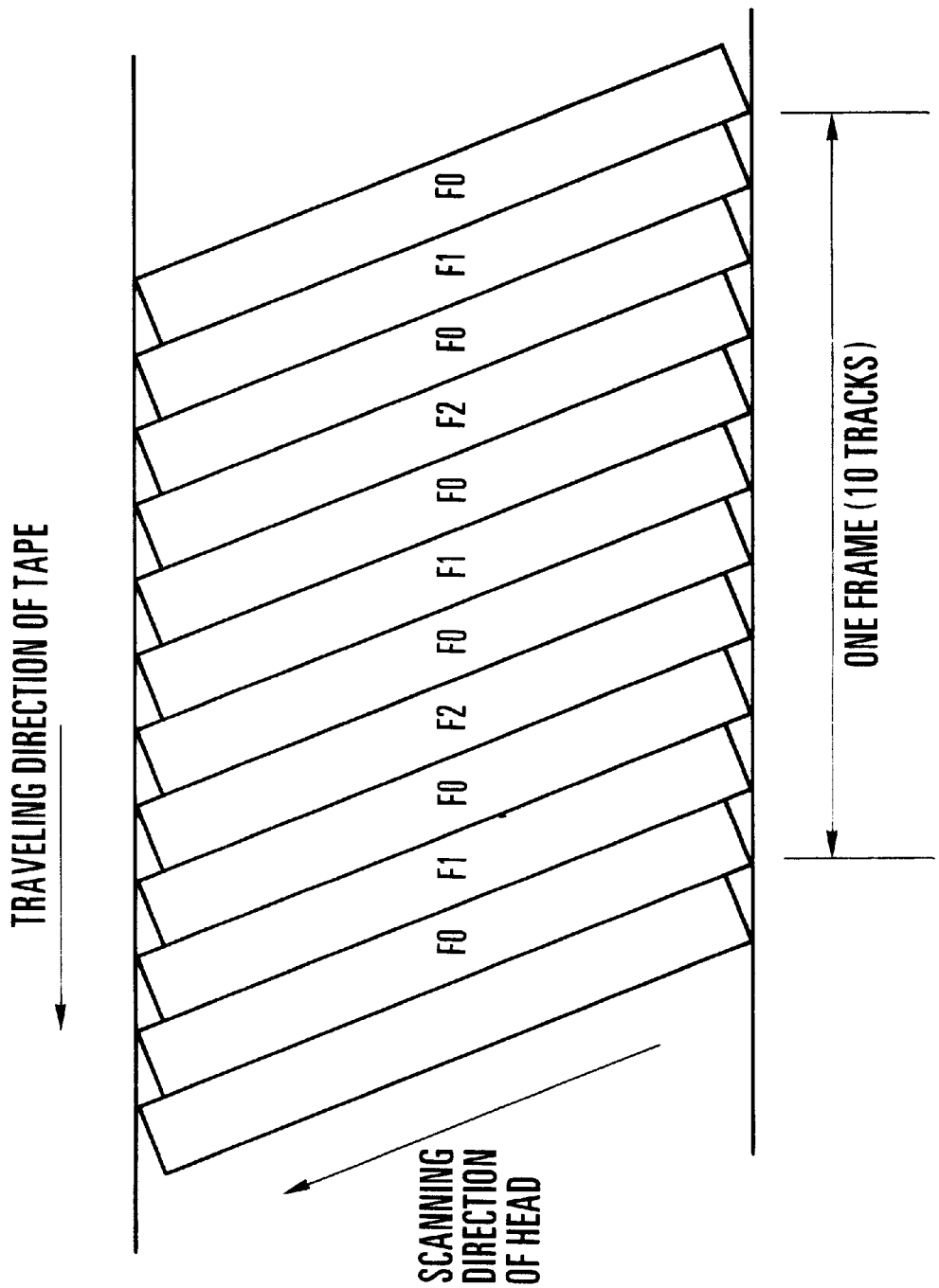
FIG. 17 shows a recording format of the digital VTR arranged as shown in FIGS. 1, 7 or 18.

These recording tracks are formed as shown in FIG. 17. Referring to FIG. 17, each of tracks F0 has a signal recorded without any pilot signal multiplexed therewith. Each of tracks F1 has a signal recorded with the component of the frequency f1 multiplexed. Each of tracks F2 has a signal recorded with the component of the frequency f2 multiplexed therewith. With the signals recorded in this manner, tracking control is performed at the time of reproduction by detecting the magnitude of the pilot signals leaking from adjoining tracks and by controlling the travel of the tape in such a way as to have these pilot signals in one and the same magnitude.

In the case of the second embodiment, the pilot signal frequency components f1 and f2 are detected by a tracking control circuit 20. A control signal for varying the relative positions of the head and each track is generated on the basis of these frequency components. The control signal is supplied to a capstan motor which is not shown.

In the case of the above-stated off-track mode, the travel of the tape is controlled in such a way, for example, as to make the magnitude of the pilot signal leaking from the track F1 become smaller than that of the pilot signal leading from the track F2. As a result of this control, the head comes to trace the track F0 in a state of having a bias toward the track F2. The amount of off-track can be kept unvarying by controlling the tape travel to adjust a balance in leaking magnitude between these pilot signals in the above-stated manner.

For the error number counting process shown in FIG. 13, the second embodiment is arranged to count the number of errors in the above-stated off-track mode in such a way as to increase the number of errors included in the reproduced signal, so that an S/N ratio which is necessary in setting an optimum value can be improved.

As a result, a difference between an error count number obtained at one control point and an error count number obtained at another control point becomes larger to permit detection of an optimum point at a faster speed.

Many of digital VTRs on the market these days have already been set to have the off-track mode before shipment from factories. In many cases, therefore, the off-track mode can be set by just utilizing an existing system without newly arranging it.

In the embodiment described in the foregoing, the equalizing characteristic of the equalizer is varied after tape loading. The equalizing characteristic of the equalizer, however, may be adjusted within a narrow range every time a reproducing action begins to be performed, not only after loading, so that any minor deviation from the optimum point due to the heat of the VTR itself or a change in ambient temperature can be corrected.

In other words, the embodiment described in the foregoing is arranged to adjust the equalizer before a reproduced image begins to be obtained with reproducing processes actually performed on the image after the cassette is inserted. This arrangement may be changed to adjust the equalizer while the reproducing processes are in process. Another embodiment of this invention described below is arranged to adjust the equalizer while the VTR is in process of reproduction.

Figure 18:
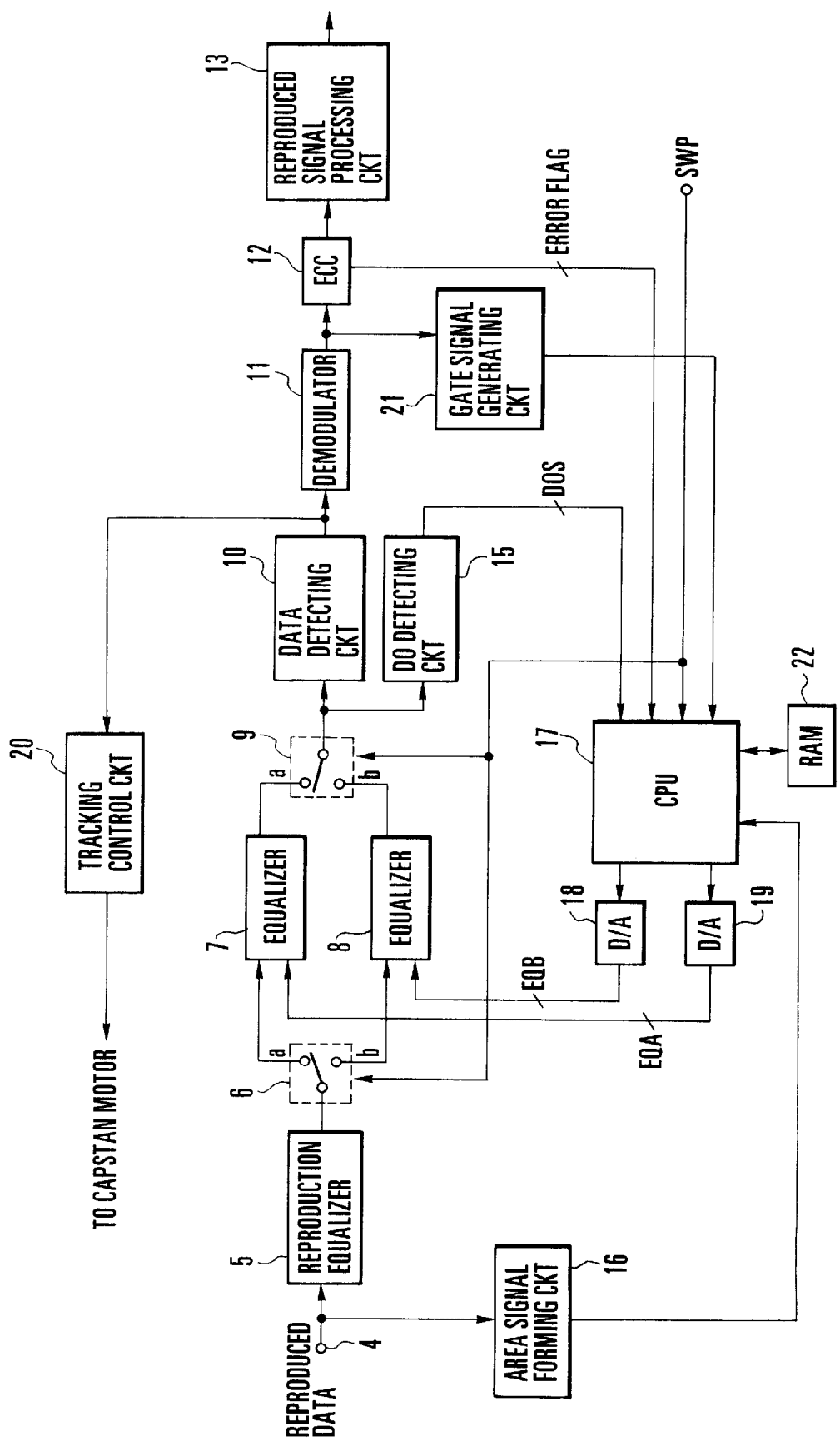
FIG. 18 shows in a bock diagram the arrangement of a digital VTR which is another embodiment of this invention.

FIG. 18 shows the arrangement of a digital VTR which is the above-stated embodiment. The arrangement is almost the same as the arrangement described with reference to FIG. 7. The details of the arrangement are, therefore, omitted from the following description.

Figure 19:
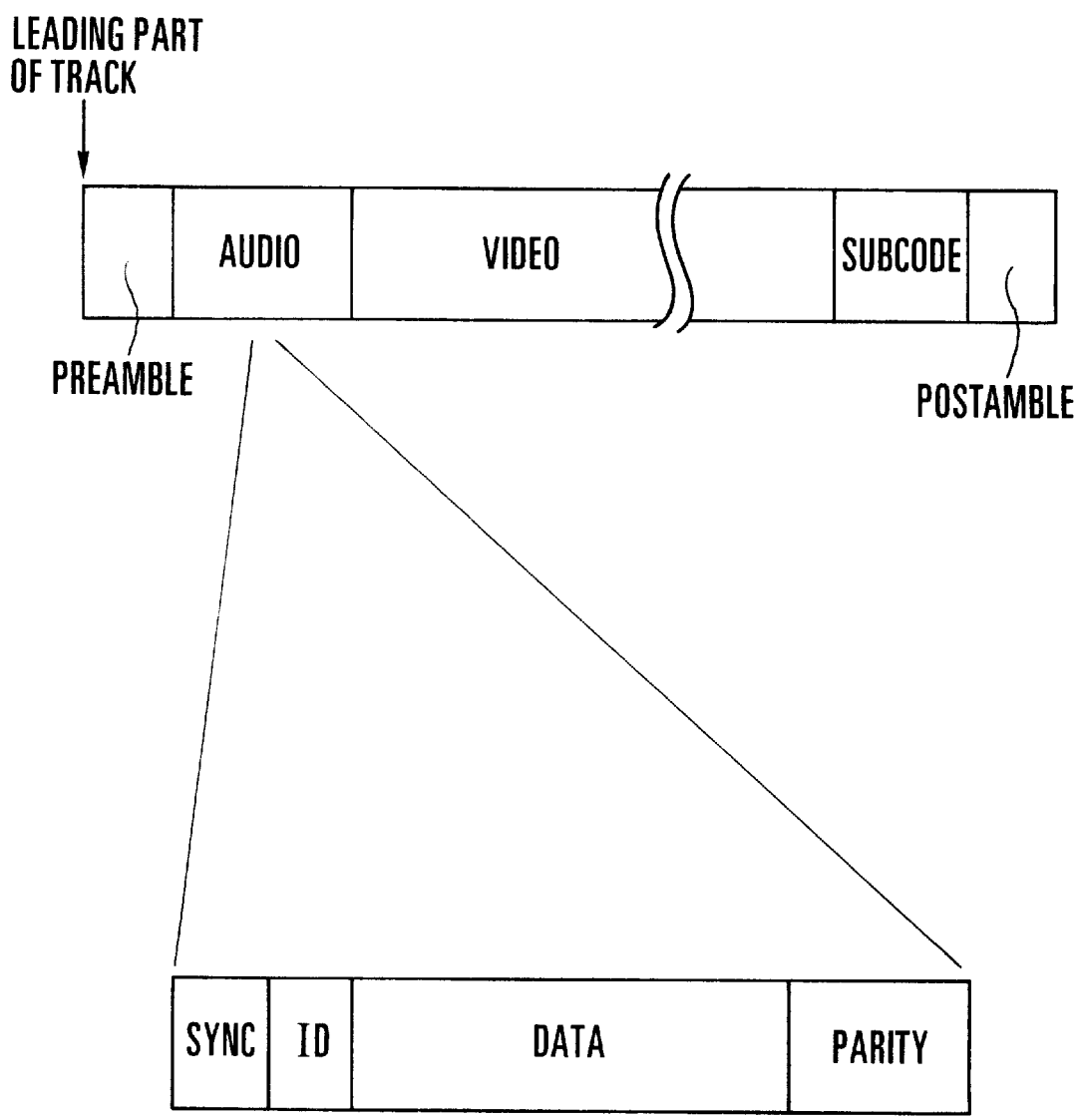
FIG. 19 shows how data is recorded in each of tracks shown in FIG. 17.

The data recording format of the embodiment is first described as follows. In the embodiment, recording tracks are formed on the tape in the same manner as the tracks shown in FIG. 17. FIG. 19 shows the details of each recording track. As shown, data is recorded and reproduced in a time-division multiplexing manner in and from each track in the order of, from its leading part, a preamble part, an audio part, a video part, a subcode part and a postamble part. The preamble and postamble parts are repeating signals called runup patterns. These signals remain unvarying irrespective of the contents of the audio and video data and are provided for the purpose of stably generating clock pulses in synchronism with the digital data being reproduced.

The audio part consists of audio data. The video part consists of video data. In the subcode part, information on track numbers, etc., are recorded to permit a quick search for any desired leading part. Each of the audio, video and subcode data is composed of a so-called sync-block including a synchronizing (sync) signal, an ID signal and a video data part or an audio data part, or a parity part which is provided for error correction. A sync-block number is recorded in the ID part. The ECC circuit 12 is arranged to perform its error correcting process, using the sync-blocks as processing units.

The adjustment of the equalizing characteristics of the equalizers 7 and 8 is next described as follows.

Referring to FIG. 18, the output of a gate signal generating circuit 21 is supplied to the CPU 17. The gate signal generating circuit 21 is arranged to receive a signal demodulated by the demodulator 11, to generate a gate signal (a) which comes to show a high level at the subcode part, as shown in FIG. 20, by carrying out a discriminating action on data included in the demodulated signal, and to supply the gate signal (a) to the CPU 17.

Figure 20:
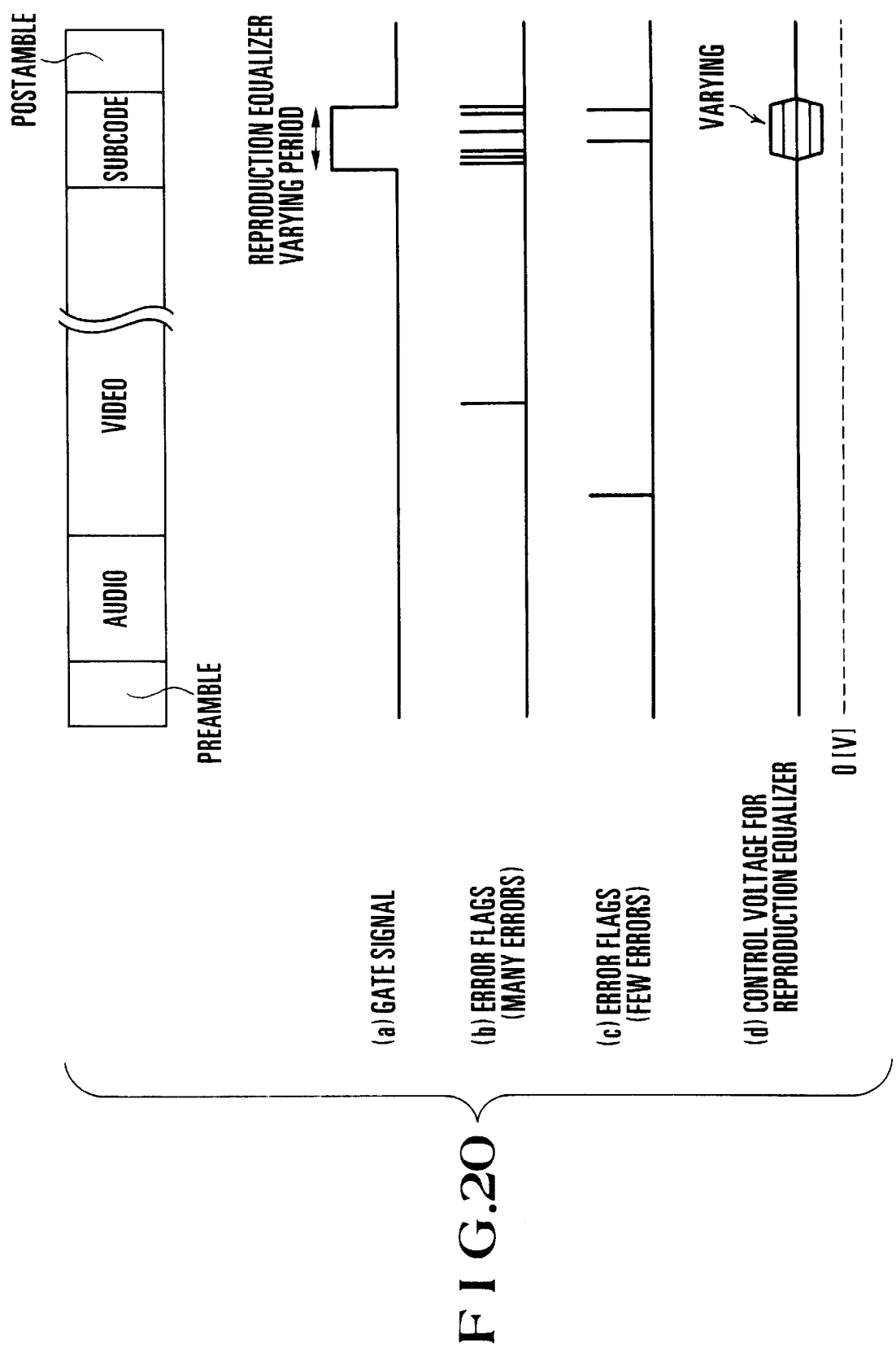
FIG. 20 shows in detail how the characteristic of an equalizer included the VTR of FIG. 18 is controlled.

Referring to FIG. 20, the CPU 17 is arranged to positively vary, within a wide range, the voltage (d) of its control signals supplied to the equalizers 7 and 8, during a period for which the gate signal (a) is at the high level. With the control voltage thus varied, the equalizing characteristics of the equalizers 7 and 8 can be varied.

Then, since the number of error flags outputted from the ECC circuit 12 increases and decreases as shown at parts (b) and (c) of FIG. 20, the CPU 17 counts the number of the error flags and detects a point where the error flags are obtained in a minimum number in the same manner as described in the foregoing with reference to FIGS. 12, 13 and 14. The value of an optimum equalizer control voltage thus detected is stored in a RAM 22. An apposite equalizing characteristic then can be obtained by causing the equalizers 7 and 8 to operate at the optimum control voltage for the audio and video parts.

Figure 5:
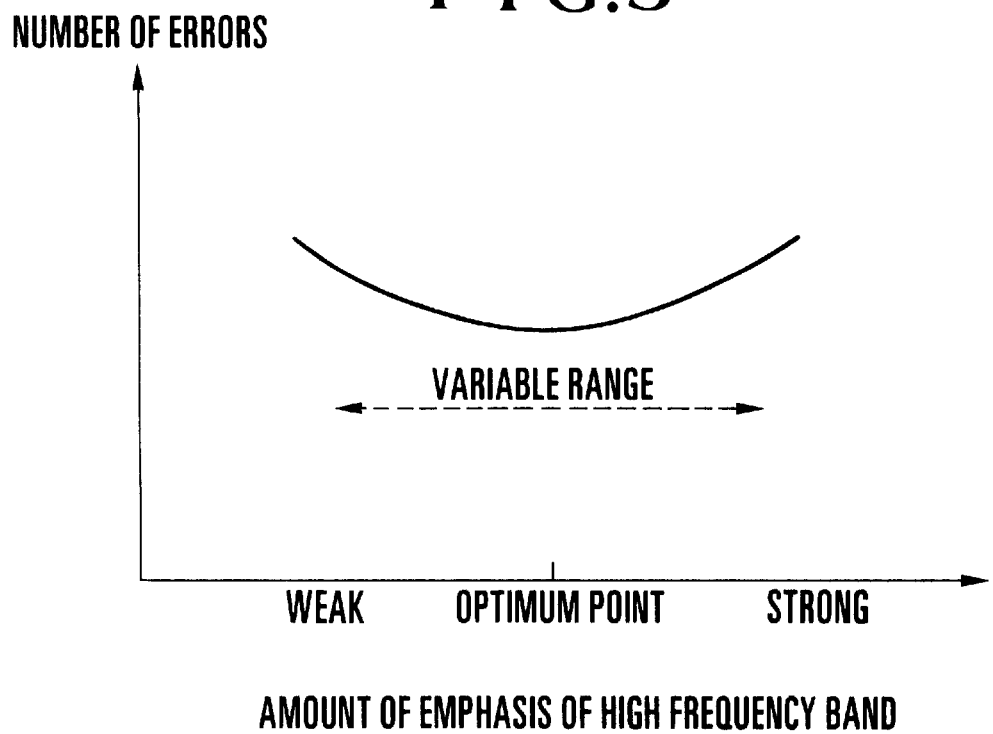
FIG. 5 shows the changes taking place in the equalizing characteristic in relation to error data.
Figure 6:
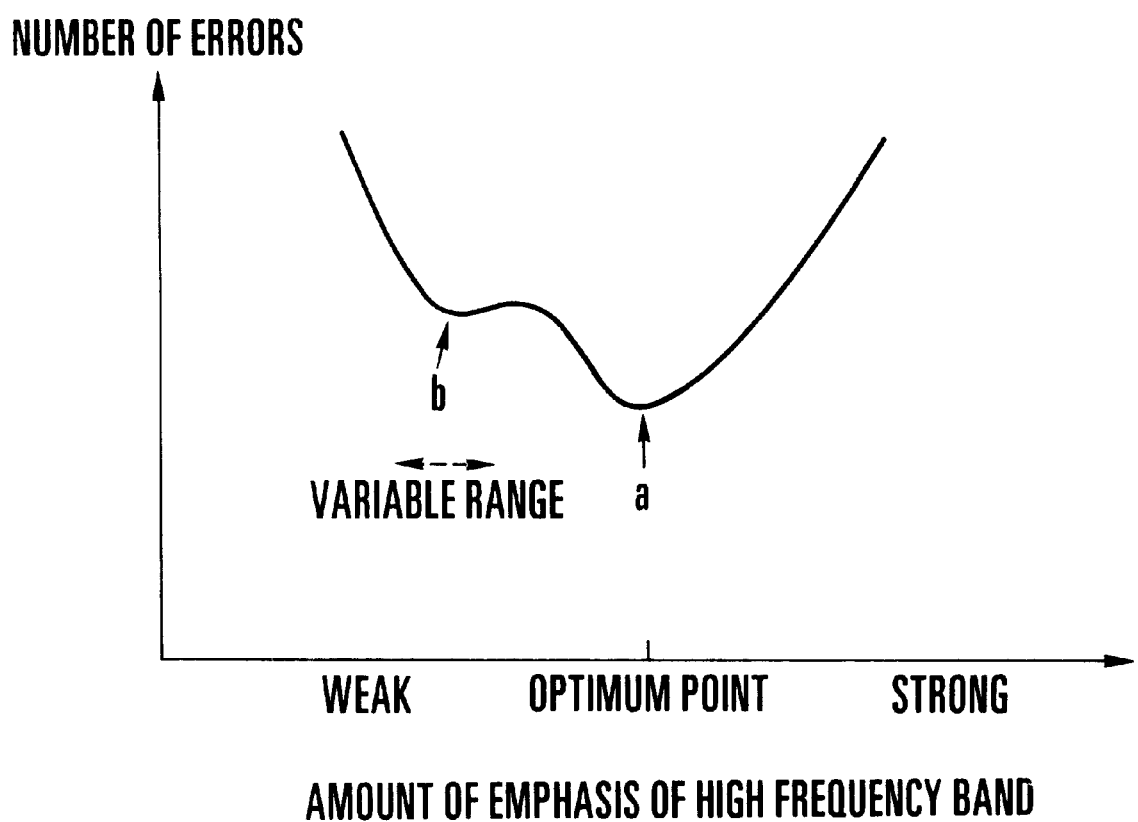
FIG. 6 shows the changes taking place in the equalizing characteristic in relation to error data.

At that time, the characteristic might become inadequate at two ends of the characteristic variable range for the equalizer 7 or 8 as shown in FIGS. 5, 6 and 15. As a result, erroneous data might increase in the subcode part of the reproduced signal. However, since it is information on a track number or the like that is recorded in the subcode part, as mentioned above, the video and audio signals reproduced are never seriously affected by any uncorrectable error of the subcode part in the normal reproduction mode. Therefore, the quality of the reproduced images and sounds is not deteriorated. Besides, since the contents of the subcode are readily inferable from data obtained from the subcode parts of the adjoining tracks, there arises no problem.

The embodiment is arranged as described above to greatly vary the equalizing characteristic of the equalizer while the subcode data is being reproduced. Therefore, the equalizing characteristic can be optimized without seriously affecting the reproduced signal.

While the embodiment is arranged to vary the characteristic of the equalizer during the period of reproducing the subcode signal (or data), the arrangement may be changed to vary the characteristic of the equalizer during the period of reproducing a specific sync-block within the video data reproducing period as shown in FIG. 21. In this instance, even if the number of uncorrectable error data increases during this period, an adequate reproduced image can be obtained by carrying out an interpolating process in a subsequent stage.

The digital VTRs are generally arranged these days to record data of distant parts of the image plane within one sync-block by a method called a shuffling process. According to this method, therefore, errors in some sync-block can be dispersed over an image plane of the reproduced video signal and the error parts can be made inconspicuous by interpolating them with image signals obtained around the erroneous data.

The embodiment described is arranged to generate a gate signal from the output of the demodulator 11. However, since the purpose of the gate signal is for discriminating a specific period of the reproduced signal from other periods, the gate signal may be formed on the basis of the rotation phase signal (PG) indicating the rotation phase of the rotary drum D shown in FIG. 1.

Further, as described in the foregoing with reference to FIG. 11, an apposite value of the equalizing characteristic is roughly detected by greatly varying the characteristic before the reproduced signal is obtained after insertion of the cassette, and, during the actual process of reproducing the video and audio signals, the characteristic is finely adjusted within a narrow range on the basis of the roughly detected apposite value. This arrangement enables the embodiment to adequately carry out control over the equalizing characteristic without seriously affecting even the subcode part of the reproduced signal. In other words, during the subcode part reproducing period, the numbers of errors obtained at control points located ahead and behind the optimum value shown in FIG. 15 by eight points or thereabout are counted, and a point where a minimum number of errors is obtained is detected.

While each of the embodiments described is arranged to vary the equalizing characteristic of the equalizer, the invention is not limited to that but also applies to a case where the frequency characteristic of the reproduced signal is to be controlled. In that case, the frequency characteristic can be controlled by various conceivable methods. In one conceivable method, for example, a loss taking place through a transmission system is compensated for by controlling the resonance frequency characteristic of the head amplifier.

The embodiments described are arranged to adjust the equalizer every time a reproducing operation begins. However, this arrangement may be changed to adjust the equalizer after the reproduction comes to a stop.

In the case of each embodiment described, this invention is applied to a digital VTR. However, this invention is not limited to such VTRs but is likewise applicable to systems for transmitting, recording and reproducing digital signals, such as communication by a radio wave or light and optical disks, etc.

While this invention is applied to a digital VTR in the case of each of the embodiments described, this invention is not limited to the digital VTRs but also applies to other apparatuses as long as they are arranged to control the frequency characteristic of a signal reproduced from a recording medium other then a tape.

As apparent from the foregoing description, the equalizing characteristic is controlled during a predetermined period before the commencement of signal reproduction, so that the reproduced signal can be prevented from being affected by the adverse effect of changes taking place in the equalizing characteristic. The equalizing characteristic thus can be optimized without impairing the quality of the reproduced signal.

Further, according to this invention, the equalizing characteristic is controlled according to a gate signal which is synchronized with an input signal. The gate signal permits, for example, selection of a gate period during which no adverse effect will be brought about on a signal outputted. The selection of such a gate period ensures that the equalizing characteristic can be optimized without impairing the quality of the signal outputted.

What is claimed is:

1. A reproducing apparatus comprising:
   input means for receiving an input video signal reproduced by reproducing means;
   equalizing means for equalizing the input video signal;
   error correction means for correcting errors in the reproduced video signal by using an error correction check code added to the reproduced video signal and detecting the errors which cannot be corrected;
   output means for outputting the video signal equalized by said equalizing means to outside of said apparatus, said apparatus has a first mode during which said equalizing means equalizes the input video signal and said output means outputs a video signal output from said equalizing means to outside of said apparatus and a second mode during which said equalizing means equalizes the input video signal and said output means stops outputting a video signal output from said equalizing means to outside of said apparatus; and
   control means for adjusting an equalizing characteristic of said equalizing means in the second mode according to the errors detected by said error correction means.

2. An apparatus according to claim 1, wherein said error correction means comprises error detecting means for detecting errors included in the video signal outputted from said equalizing means, and wherein said control means is arranged to decide an optimum equalizing characteristic of said equalizing means by using an output of said error detecting means.

3. An apparatus according to claim 2, wherein said control means is arranged to decide an equalizing characteristic at which the signal outputted from said equalizing means has a minimum error rate to be the optimum equalizing characteristic.

4. An apparatus according to claim 2, wherein said control means is arranged to decide the optimum equalizing characteristic according to a result of accumulation obtained by accumulating the output of said error detecting means.

5. An apparatus according to claim 4, further comprising dropout detecting means for detecting a dropout of the input video signal, wherein said control means is arranged to accumulate the output of said error detecting means during a period other than a period for which the dropout is detected.

6. An apparatus according to claim 1, wherein said control means varies the equalizing characteristic within a predetermined variable range in the second mode.

7. An apparatus according to claim 6, wherein said control means further varies the equalizing characteristic within a range which is narrower than the predetermined variable range in the first mode.

8. A reproducing apparatus comprising:
   reproducing means for reproducing a video signal from a recording medium, said reproducing means having head means for obtaining the video signal by tracing a plurality of tracks formed on the recording medium;
   tracking control means for controlling a relative position between said head means and the tracks;
   equalizing means for equalizing the reproduced video signal;
   output means for outputting the video signal equalized by said equalizing means to outside of said apparatus;
   error correction means for correcting errors in the reproduced signal by using an error correction check code added to the reproduced video signal and detecting the errors which cannot be corrected; and
   characteristic control means for adjusting an equalizing characteristic of said equalizing means according to the errors detected by said error correction means, with said head means set in an off-track state by said tracking control means, wherein said output means stops outputting a video signal output from said equalizing means to outside of said apparatus during a period during which said control means adjusts the equalizing characteristic of said equalizing means.

9. An apparatus according to claim 8, wherein said head means has a plurality of heads, and wherein said equalizing means includes a plurality of equalizers which respectively correspond to said plurality of heads.

10. An apparatus according to claim 9, wherein said characteristic control means is arranged to control equalizing characteristics of said plurality of equalizers independently of each other.

11. An apparatus according to claim 8, wherein said equalizing means includes a first equalizer which has a fixed equalizing characteristic and a second equalizer which has a variable equalizing characteristic.

12. A signal processing apparatus comprising:
    equalizing means for equalizing an input video signal;
    output means for outputting the video signal equalized by said equalizing means; error correction means for correcting errors in the input video signal by using an error correction check code added to the input video signal and detecting the errors which cannot be corrected;
    gate signal generating means for generating a gate signal to discriminate a specific signal from other signals of the video signal output from said equalizing means, the errors detected by said error correction means being synchronized with the input video signal; and
    control means for adjusting an equalizing characteristic of said equalizing means according to the gate signal, said control means adjusting the equalizing characteristic during a predetermined period indicated by the gate signal and maintaining the adjusted equalizing characteristic during a period other than the predetermined period indicated by the gate signal, wherein said output means outputs a video signal output from said equalizing means during the period other than the predetermined period and stops outputting a video signal output from said equalizing means during the predetermined period.

13. An apparatus according to claim 12, wherein said error correction means comprises error detecting means for detecting errors included in the video signal outputted from said equalizing means, wherein and said control means is arranged to decide an optimum equalizing characteristic of said equalizing means on the basis of an output of said error detecting means.

14. An apparatus according to claim 12, wherein an audio signal and an additional signal are also inputted with the video signal 15. An apparatus according to claim 14, wherein the gate signal is a signal indicating a period during which the additional signal is inputted.

16. An apparatus according to claim 12, further comprising reproducing means for reproducing the input video signal from a tape-shaped recording medium on which a number of oblique tracks are formed, wherein said gate signal generating means is arranged to generate, as the gate signal, a signal indicating a period during which a video signal recorded in a predetermined position in each of the number of oblique tracks is reproduced.

17. A reproducing apparatus comprising:

receiving means for receiving an input video signal reproduced by reproducing means;

an equalizer;

error correction means for correcting errors in the reproduced video signal by using an error correction check code added to the reproduced video signal and detecting the errors which cannot be corrected;

output means for outputting the video signal equalized by the equalizer to outside of said apparatus;

control means for adjusting an equalizing characteristic of the equalizer according to the errors detected by said error correction means; and mode setting means for setting a mode of said apparatus between a plurality of modes, the plurality of modes including a first mode in which said output means outputs a video signal output from the equalizer and the equalizing characteristic of the equalizer is fixed and a second mode in which said output means stops outputting a video signal output from said equalizer and the adjustment of the equalizing characteristic of the equalizer by said control means is performed.

18. A reproducing apparatus, comprising:

reproducing means for reproducing a video signal;

equalizing means for equalizing the video signal reproduced by said reproducing means; error correction means for correcting errors in the reproduced video signal by using an error correction check code added to the reproduced video signal and detecting the errors which cannot be corrected;

output means for outputting the video signal equalized by said equalizing means to outside of said apparatus; and control means for adjusting an equalizing characteristic of said equalizing means; according to the errors detected by said error correction means wherein said output means stops outputting a video signal output from said equalizing means to outside of said apparatus in a period during which said control means adjusts the equalizing characteristic.

19. An apparatus according to claim 18, wherein the period during which said control means adjusts the equalizing characteristic is a predetermined period relative to a reproducing operation of said reproducing means.

20. An apparatus according to claim 19, wherein said reproducing means reproduces the video signal from a recording medium, the predetermined period being a period relative to a loading operation of the recording medium.

* * * * *

UNITED STATES PATENT AND TRADEMARK OFFICE
CERTIFICATE OF CORRECTION

PATENT NO.    : 6,229,950 B1  
DATED         : May 8, 2001  
INVENTOR(S)   : Kazuna Kobayashi et al.

Page 1 of 1

It is certified that error appears in the above-identified patent and that said Letters Patent is hereby corrected as shown below:

Column 8,  
Line 3, delete "multiplxed" and insert -- multiplexed --.

Column 10,  
Line 23, delete "erroneous.data." and insert -- erroneous data. --.

Signed and Sealed this

Twenty-sixth Day of March, 2002

Attest:

*Attesting Officer*

JAMES E. ROGAN  
*Director of the United States Patent and Trademark Office*